(12) United States Patent
Saiki

(10) Patent No.: US 7,100,930 B2
(45) Date of Patent: Sep. 5, 2006

(54) BICYCLE REAR SUSPENSION SYSTEM

(76) Inventor: Neal Tate Saiki, 111 Bean Creek Rd. Unit 42, Scotts Valley, CA (US) 95066

( * ) Notice: Subject to any disclaimer, the term of this patent is extended or adjusted under 35 U.S.C. 154(b) by 0 days.

(21) Appl. No.: 10/662,870

(22) Filed: Sep. 15, 2003

(65) Prior Publication Data
US 2005/0057018 A1 Mar. 17, 2005

(51) Int. Cl.
B62K 3/00 (2006.01)

(52) U.S. Cl. ..................................... 280/284

(58) Field of Classification Search ................ 280/283, 280/284, 285, 275
See application file for complete search history.

(56) References Cited

U.S. PATENT DOCUMENTS

| 465,599 | A |  | 12/1891 | McGlinchey |  |
|---|---|---|---|---|---|
| 281,911 | A |  | 11/1911 | Horton |  |
| 3,982,770 | A |  | 9/1976 | Sotoh |  |
| 5,452,910 | A | * | 9/1995 | Harris | 280/284 |
| 5,725,225 | A | * | 3/1998 | Lai | 280/275 |
| 5,785,339 | A | * | 7/1998 | Mamiya et al. | 280/283 |
| 5,813,683 | A |  | 9/1998 | Kulhawik |  |
| 6,073,950 | A |  | 6/2000 | Busby |  |
| 6,099,010 | A | * | 8/2000 | Busby | 280/284 |
| 6,109,636 | A |  | 8/2000 | Klein |  |
| 6,131,934 | A | * | 10/2000 | Sinclair | 280/284 |
| 6,450,521 | B1 |  | 9/2002 | Turner |  |
| 2003/0132603 | A1* |  | 7/2003 | Girard | 280/283 |
| 2004/0061305 | A1* |  | 4/2004 | Christini | 280/284 |

OTHER PUBLICATIONS

Article by Richard Cunningham, Haro Goes Super Sonix, mag. Mountain Bike Action, Oct. 2005, p. 91-92, vol. 20 #10, Daisy/Hi Torque Publishing CA USA.
U.S. Appl. No. 10/072,337, filed Jun. 15, 2002, Neal Saiki, Abandoned.
Article by Richard Cunningham, Built For Hammerheads, mag. Mountain Bike Action, May 2006, p. 78-80, vol. 21 #5, Daisy/Hi Torque Publishing CA USA.
Article by Staff, Bike Of The Year 2006, Mountain Biking Magazine, May 2006, p. 28-31, Challenge Publications Inc CA USA.

* cited by examiner

Primary Examiner—Tony Winner

(57) ABSTRACT

A bicycle rear suspension of the type where the crank set is mounted on the swingarm. The swingarm is connected to the main frame by a set of pivoting links that downwardly converge. The links produce an instant center of rotation for the swingarm that moves in a rearward path. The rearward path starts from horizontally forward of the crank center and moves to be approximately horizontally in line with the crank center. This reduces the vertical movement of the cranks as the suspension is compressed.

10 Claims, 11 Drawing Sheets

BICYCLE REAR SUSPENSION SYSTEM

BACKGROUND

1. Field of Invention

This invention relates to rear wheel suspensions for bicycles. More particularly to an improvement on the rear suspension systems that have the crank axle mounted on the swingarm.

2. Discussion of Prior Art

Rear wheel suspension systems for bicycles have been designed for over a century. There are numerous methods of providing suspension for the rear wheel. In general, they work by having a main frame on the forward end and some form of a swingarm attached to it. The rear wheel is generally attached at the rearward end of the swingarm. The swingarm is allowed to move independently from the main frame so as to provide the suspension action. The rider turns a crank assembly comprising pedals, cranks and a crank axle. The power is transmitted to the rear wheel by a chain driven transmission. The suspension systems can roughly be divided into two categories: those that have the crank axle mounted on the main frame and those that have the crank axle mounted on the swingarm.

The first category has the crank axle mounted on the main frame. In these systems there are one or more pivoting connections in the path between the crank axle and the rear wheel. A simple version of this system with a single pivot is schematically shown in FIG. 2. There are significant disadvantages to these systems:

a) The distance between the rear axle and the crank axle is not constant throughout the suspension travel. Since power from the crank axle is transmitted to the wheel by a chain, this variation in distance causes disturbances in the power transmission.

b) There is the structural problem of having a pivot in the load path between the crank axle and the wheel. During pedaling, there is considerable chain tension, which is delivered in pulses. The swingarm pivot is subject to all of these pulses and it is very difficult to make the pivot durable, stiff and light.

c) The swingarm is also susceptible to unwanted actuation caused by the pedaling pulses in the drive train. This phenomenon is commonly referred to as "bobbing". Ideally the swingarm pivot would be located such that the variation in chain tension would not cause bobbing. However it is not possible to locate the pivot such that there is not bobbing in any gear choice. The wide range of gear ratios offered by modern drive trains (currently 27 speeds) causes the chain tension and chain angle to vary widely depending on gear selection. Therefore the pivot location is a compromise that works better for some gear combinations and worse for others.

The present invention falls into the second category where the crank axle is mounted on the swingarm. This type of suspension is commonly referred to as a unified rear triangle design or URT. Some examples of these designs are schematically shown in FIGS. 3, 4, 5 and 6. The distance between the crank axle and the rear wheel remains constant because they are both mounted on the swing arm. This has the advantage in that the power transmission to the wheel is delivered without disturbance from suspension actuation. It also has the advantage in that the swingarm pivot is not subject to the chain tension pulses.

Current URTs have different pivot locations. FIGS. 3, 4, 5 and 6 show various pivot locations. Each pivot location has its advantages and disadvantages. The pivot location can be defined by a horizontal distance from the crank axle and a vertical distance from the crank axle. The affect of varying both the horizontal and vertical distance shall be examined separately.

FIGS. 3 and 5 show schematics of designs with the pivot horizontally forward of the crank axle. This pivot location has the drawback in that it does not maintain a constant distance between the crank axle and seat. When the pivot (center of rotation) is horizontally forward of the crank axle, the crank axle moves upward when the suspension is compressed upward. The more forward the pivot is, the greater the vertical movement in the cranks. Although the crank axle movement is a fraction of the movement of the rear wheel, it is still enough to affect the pedaling feel of the cranks because they are moving vertically relative to the rider.

The main advantage to having the pivot forward of the crank axle is that pedal induced bobbing is minimized. When the cranks are horizontal, the pedaling force is centered on the leading pedal that is approximately 175 mm (6.9 inches) in front of the crank axle. When the cranks are vertical, the pedal force is downward through the center of the crank axle. There is still significant downward pressure on the pedals even though no torque is being applied to the crank axle. The typical power stroke varies the horizontal location of the pedal force from 0 to 175 mm (6.9 inches) in front of the crank axle. Therefore it is advantageous for the pivot to have a horizontal location somewhere between 0 to 175 mm (6.9 inches). This keeps the pivot location as close to the pedal force as possible.

The vertical placement of the pivot requires consideration also. The traction force of the wheel with the ground causes the suspension to actuate in a downward direction. This traction force varies proportionally to the pedal force and proportionally to the gear selection. The traction force changes from forward to rearward when the rear brake is applied. With such a large variation of traction force, it is desirable to locate the pivot as low to the ground as possible so that it is closer in line with the traction force.

However, there is also a reason to have a higher pivot. It is desirable to have the wheel pull downward into the ground when the traction force is propelling the bike forward. This aids the wheel in gaining traction to the ground. It also helps to cancel out the rider's tendency to bounce up and then down with each pedal stroke. How far the pivot should be above ground level is still debatable. Some designs claim that the ideal vertical location is even with the crank axle. Other designs claim an even greater benefit having the pivot far above the level of the crank axle.

FIG. 4 shows a pivot location where the pivot is above the crank axle. Such designs have the advantage in that the pedal to seat distance is relatively constant, but the design tends to bob with each pedal stroke.

The pivot location shown in FIG. 3 produces almost no bobbing, but the pedal to seat distance still varies with suspension actuation. Of the fixed pivot URT designs, this one is probably the best and most commercially successful.

All the pivot locations are a compromise of qualities. None of the pivot locations produce both requirements of:

a) maintaining the pedal to seat distance within acceptable levels b) minimize the pedal induced bobbing The swingarm can pivot around a simple pivot, as shown in the previous examples, or it can be a so-called "virtual pivot". A virtual pivot is a pivot that is comprised of two links that connect the swingarm with the main frame. Each link has a pivot on each end. The two links define an instant center of rotation that is not necessarily located at any of the four pivoting connections. The instant center of rotation is located at the intersection of the two link centerlines. The link centerlines are defined as lines that contain both link pivots. Because the links rotate as the swingarm is compressed, the instant center moves with the links. The length and location of each link can be tailored to provide a specific movement of the instant center of rotation as the swingarm actuates through its range of travel.

Figure 7:
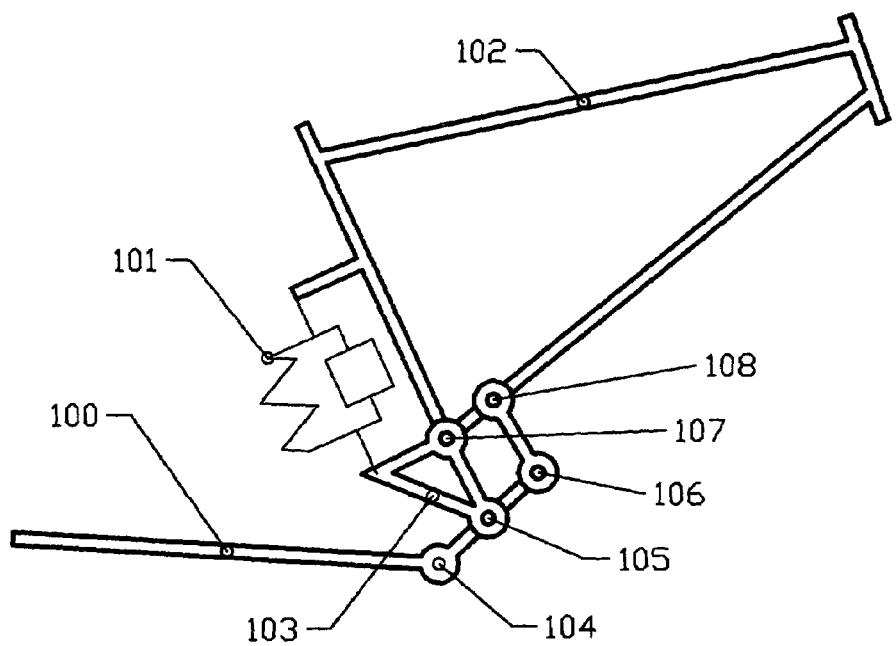

An example of a URT that utilizes a virtual pivot is disclosed by Harris in U.S. Pat. No. 5,452,910. A schematic diagram of the links is shown in FIG. 7. The virtual pivot location is located somewhere directly above the crank axle. This location is chosen in order to keep the cranks from moving excessively in the vertical direction. The virtual pivot location also causes the rear wheel to move up and back in line with the bump force. The problem with this design is that the pedal induced bobbing has not been addressed. The design is little improvement on other simple pivot designs where the pivot was directly above the crank center.

Figure 8:
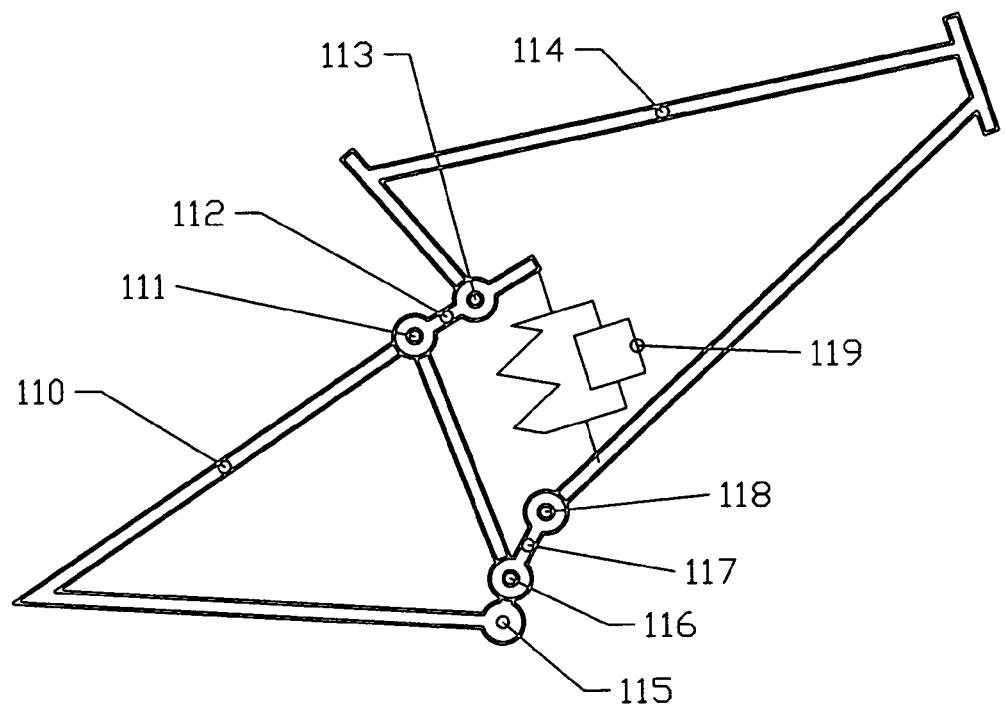

Another example of a prior art URT that utilizes a virtual pivot is shown schematically in FIG. 8. This bike was make by the American company Azonic. Here the pivot is high and in front of the crank pivot. As the suspension is compressed, the pivot moves downward. Unfortunately, the virtual pivot is too high to minimize bobbing and the crank axle still has excessive vertical movement.

Thus, a need still exists for a rear wheel suspension for bicycles which will overcome the above mentioned problems with unified rear triangle suspensions constructed to date.

OBJECTS AND ADVANTAGES

Accordingly, several objects and advantages of my invention are:

a) the power transmission to the wheel is delivered without disturbance from suspension actuation b) the swingarm pivot is not subject to the chain tension pulses c) unwanted actuation caused by the pedaling pulses in the drive train (bobbing) is minimized when the swingarm is near the sag point of its travel d) variation of crank axle to seat distance is minimized to an acceptable level Further objects and advantages are to provide a bicycle rear suspension which is lightweight, rigid, and easy to manufacture. Still further objects and advantages of my invention will become apparent from a consideration of the drawings and ensuing description.

DRAWING FIGURES

Figure 1:
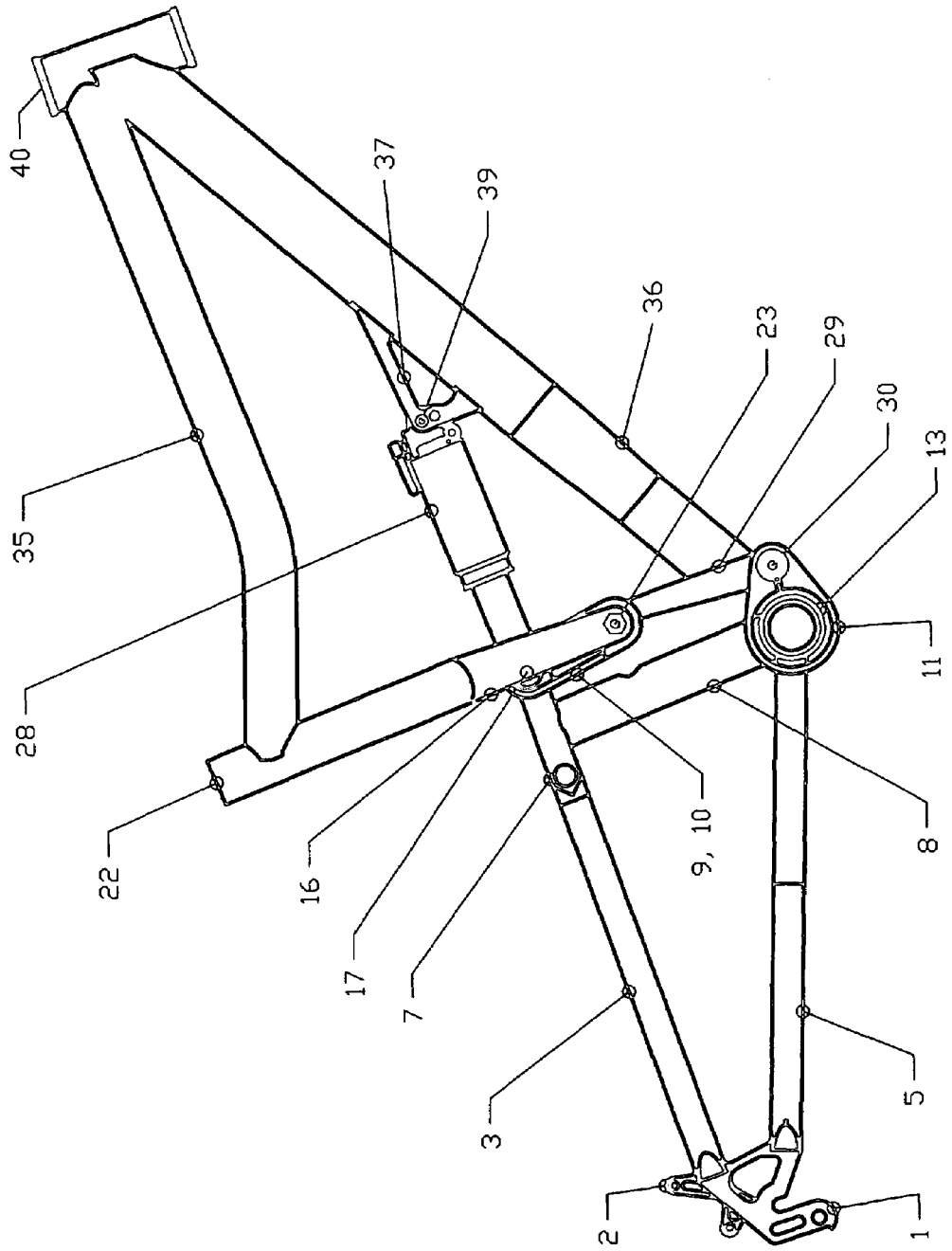

FIG. 1 shows a profile view of my invention.

Figure 2:
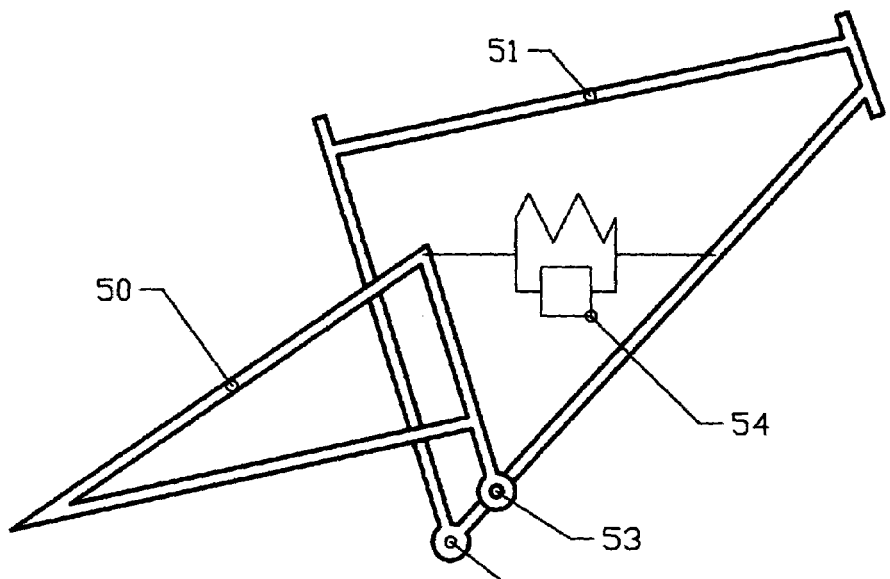

FIG. 2 shows a diagram of a prior art single pivot swingarm.

Figure 3:
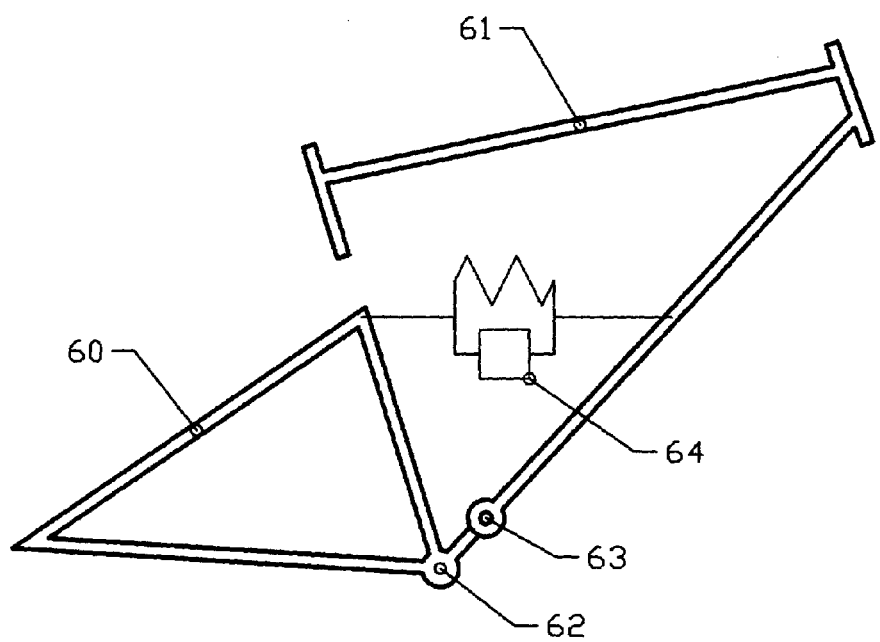

FIG. 3 shows a diagram of a prior art unified rear triangle with low forward pivot.

Figure 4:
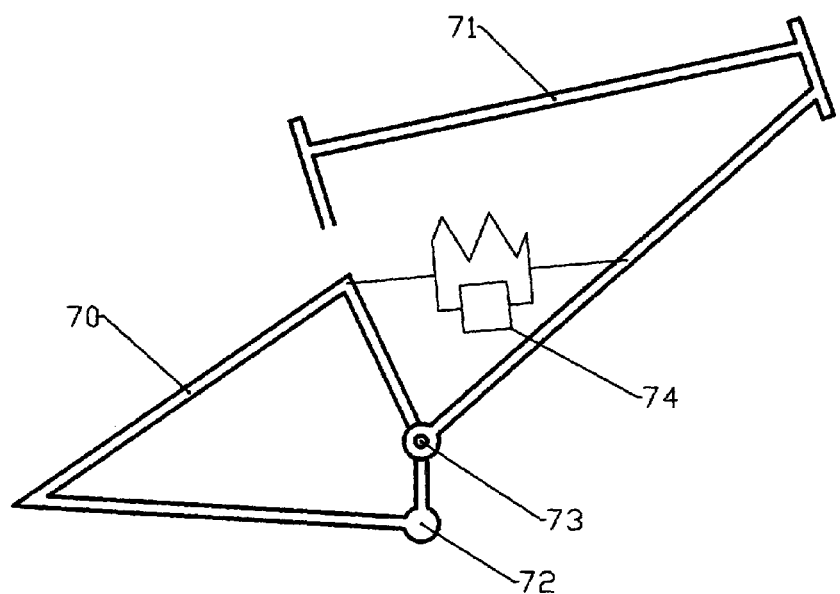

FIG. 4 shows a diagram of a prior art unified rear triangle with high pivot.

Figure 5:
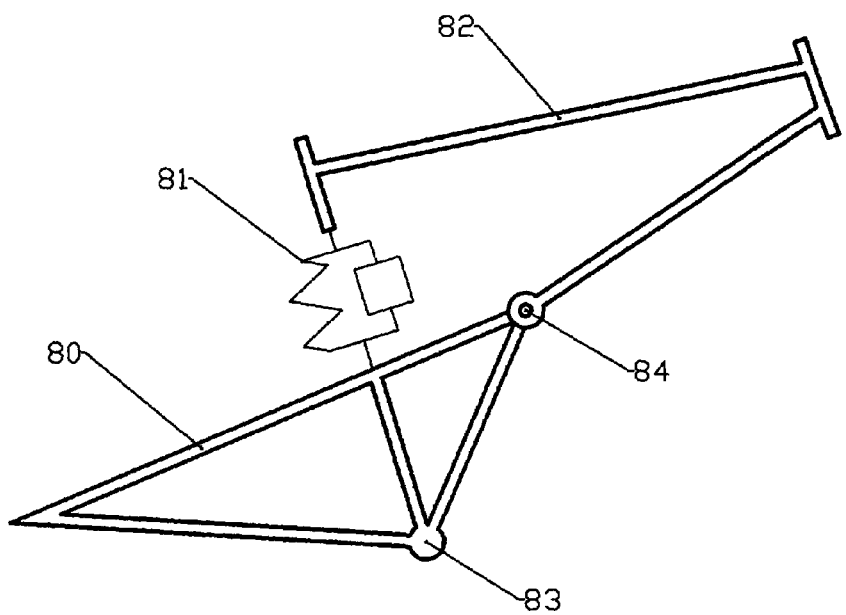
FIG. 5 shows a pivot location where the pivot is far forward and far above the crank axle. The pivot is too high to minimize bobbing and there is still the problem of the pedal to seat distance variation.

FIG. 5 shows a diagram of a prior art unified rear triangle with high forward pivot.

Figure 6:
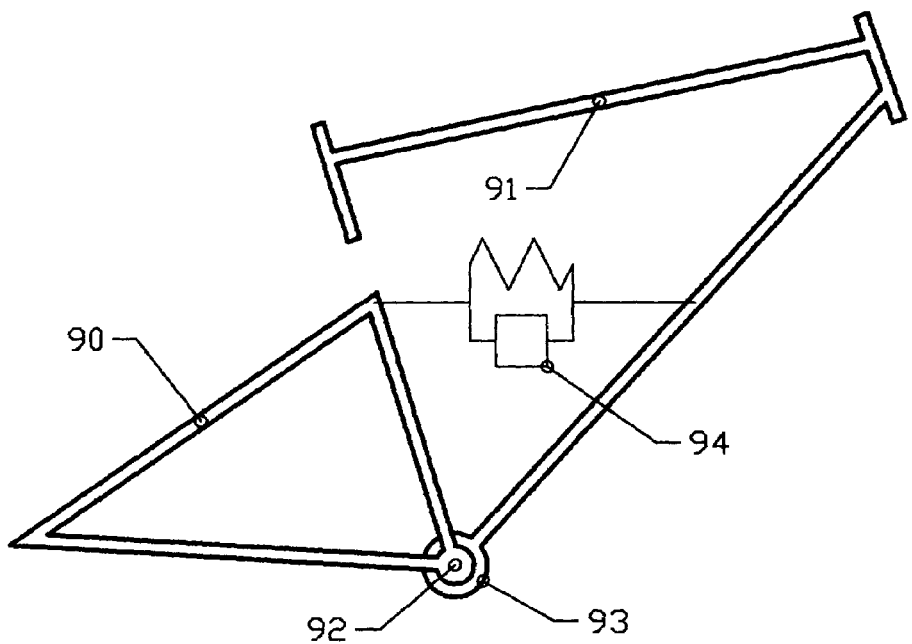
FIG. 6 shows a pivot location where the pivot is at the crank axle. In this case there is no variation in the pedal to seat distance, however these suspensions have considerable pedal induced bobbing.

FIG. 6 shows a diagram of a prior art unified rear triangle with pivot at crank axle.

FIG. 7 shows a diagram of a prior art unified rear triangle with high virtual pivot.

FIG. 8 shows a diagram of a prior art unified rear triangle with high forward virtual pivot.

Figure 9:
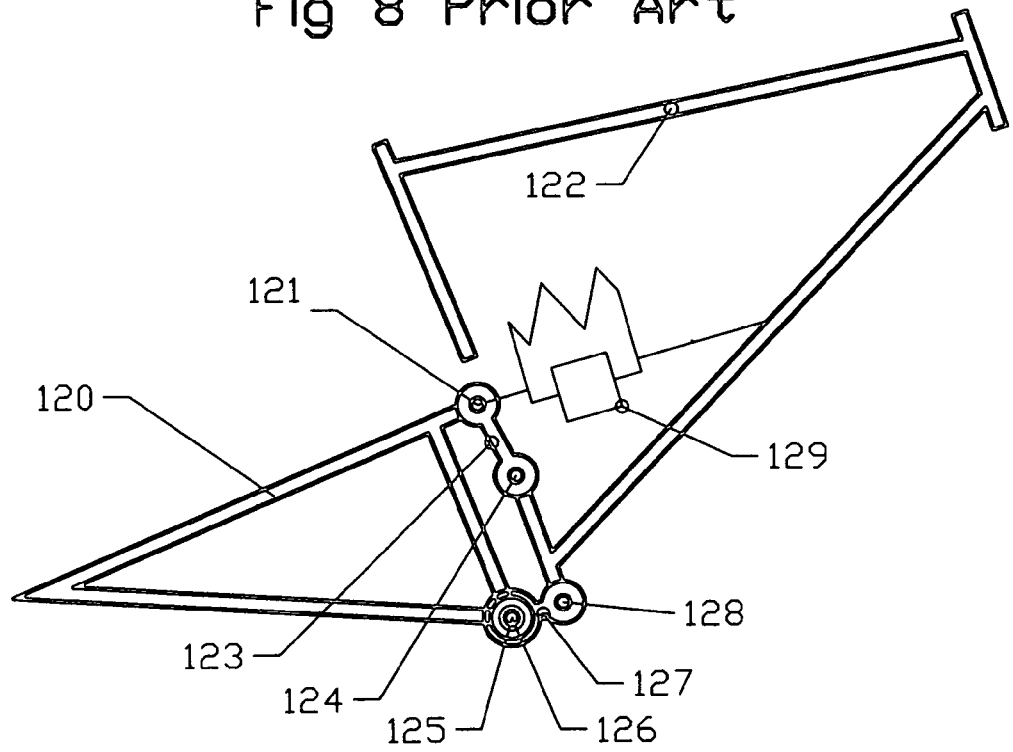

FIG. 9 shows a diagram of my invention.

Figure 10:
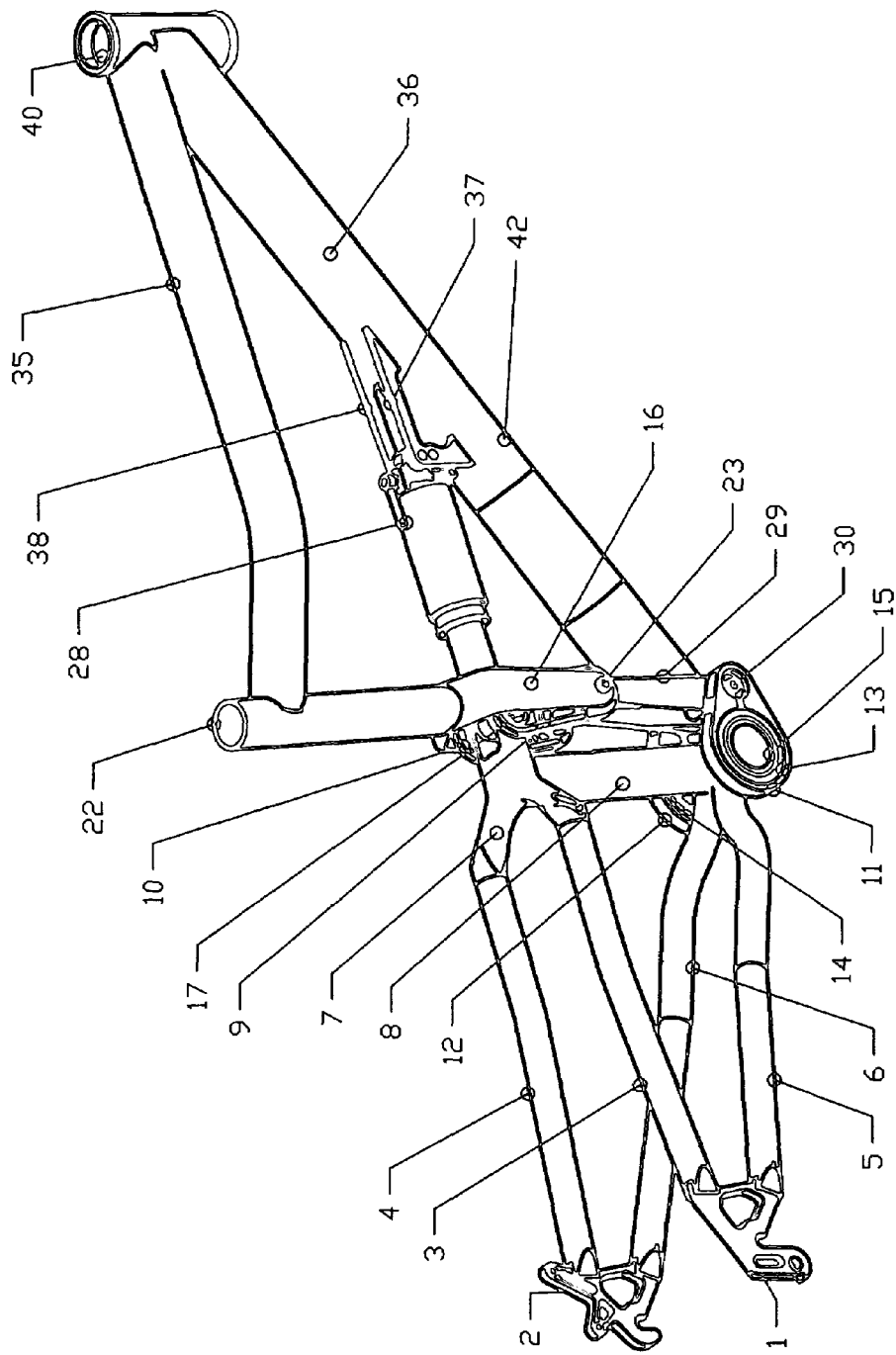

FIG. 10 shows a perspective view of my invention.

Figure 11:
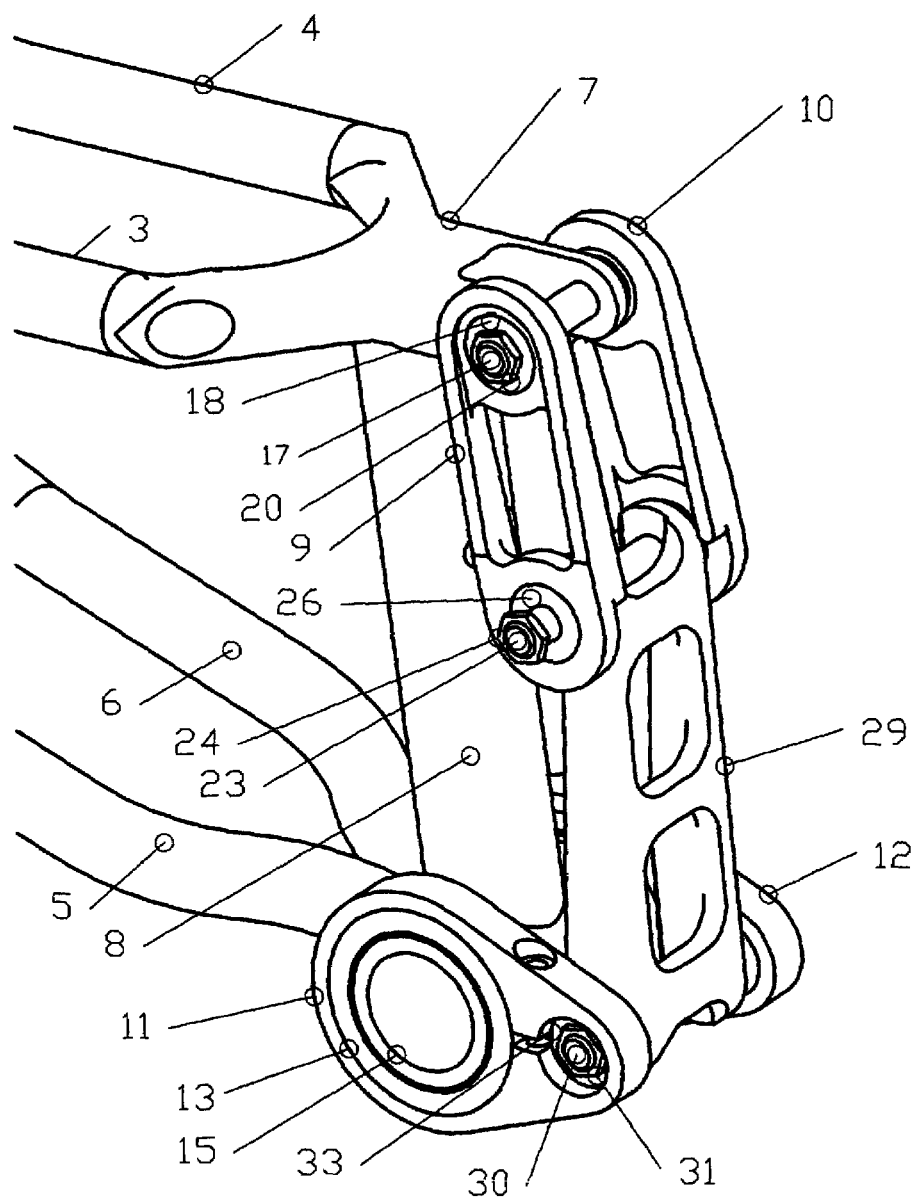

FIG. 11 shows a close up perspective view of my invention.

Figure 12:
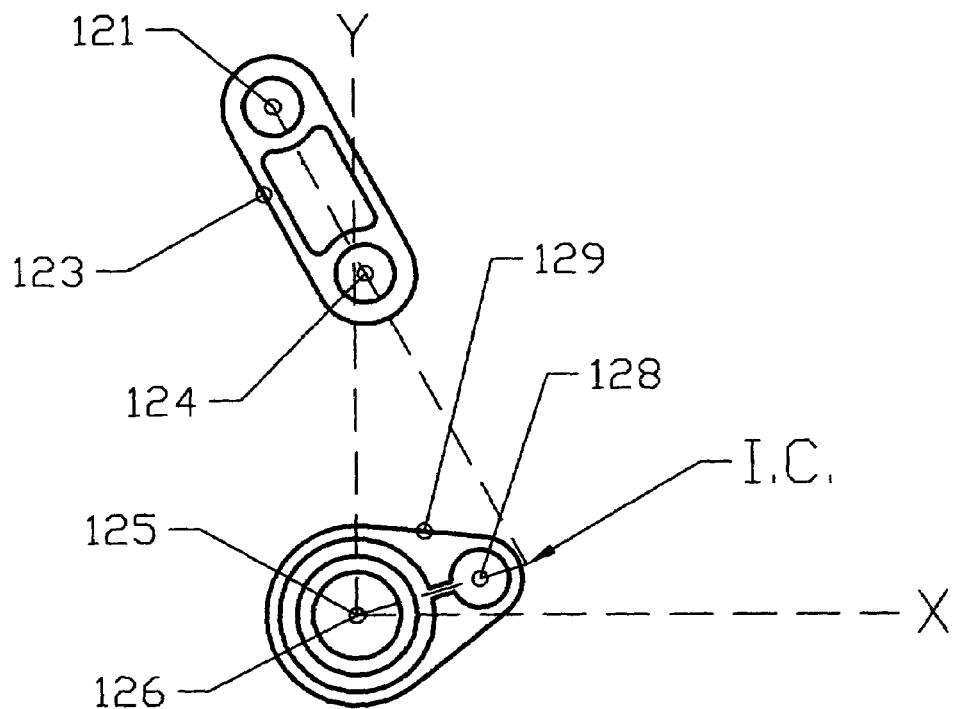

FIG. 12 shows the alignment of the pivoting links when the swingarm is uncompressed.

Figure 13:
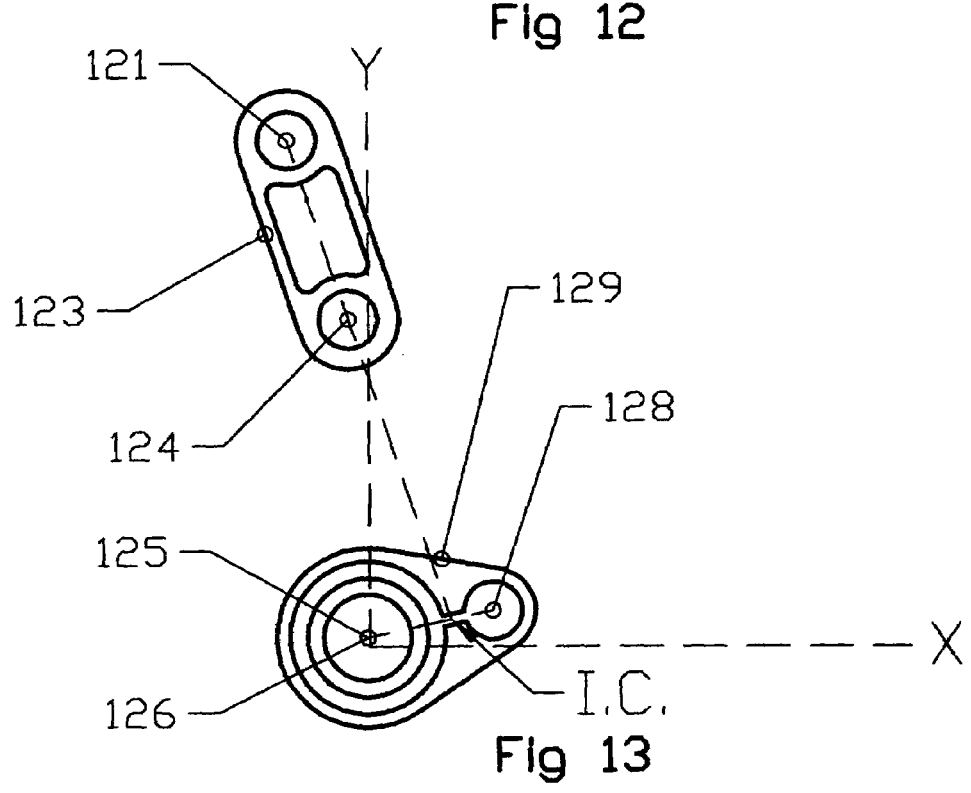

FIG. 13 shows the alignment of the pivoting links when the swingarm is at the sag position.

Figure 14:
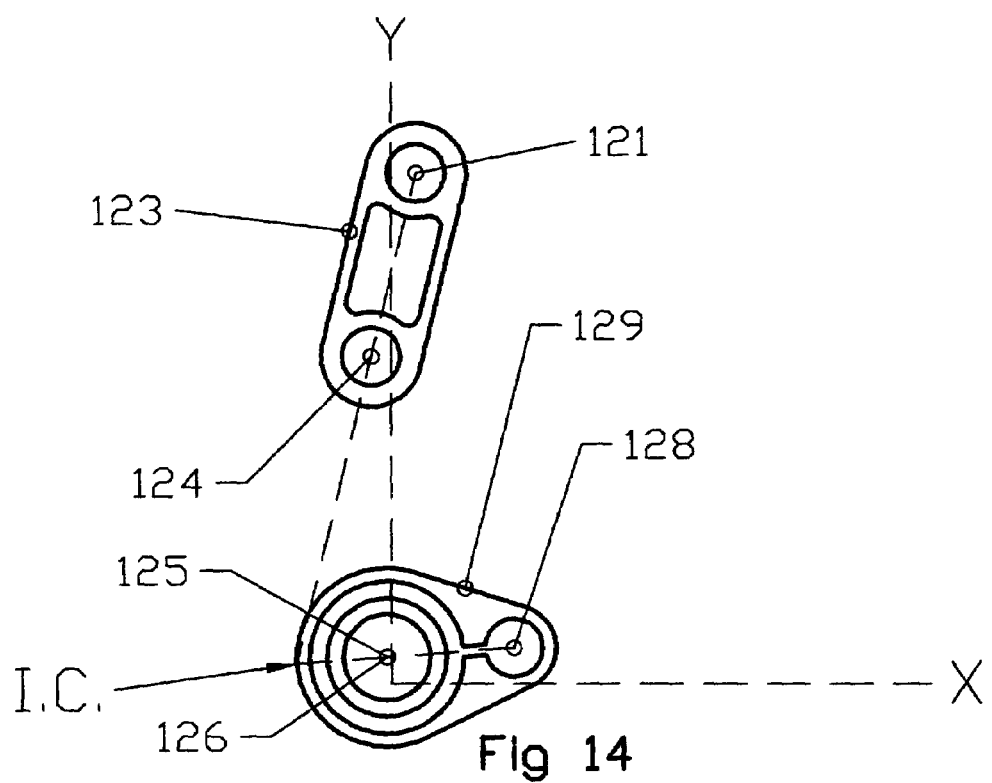

FIG. 14 shows the alignment of the pivoting links when the swingarm is compressed.

Figure 15:
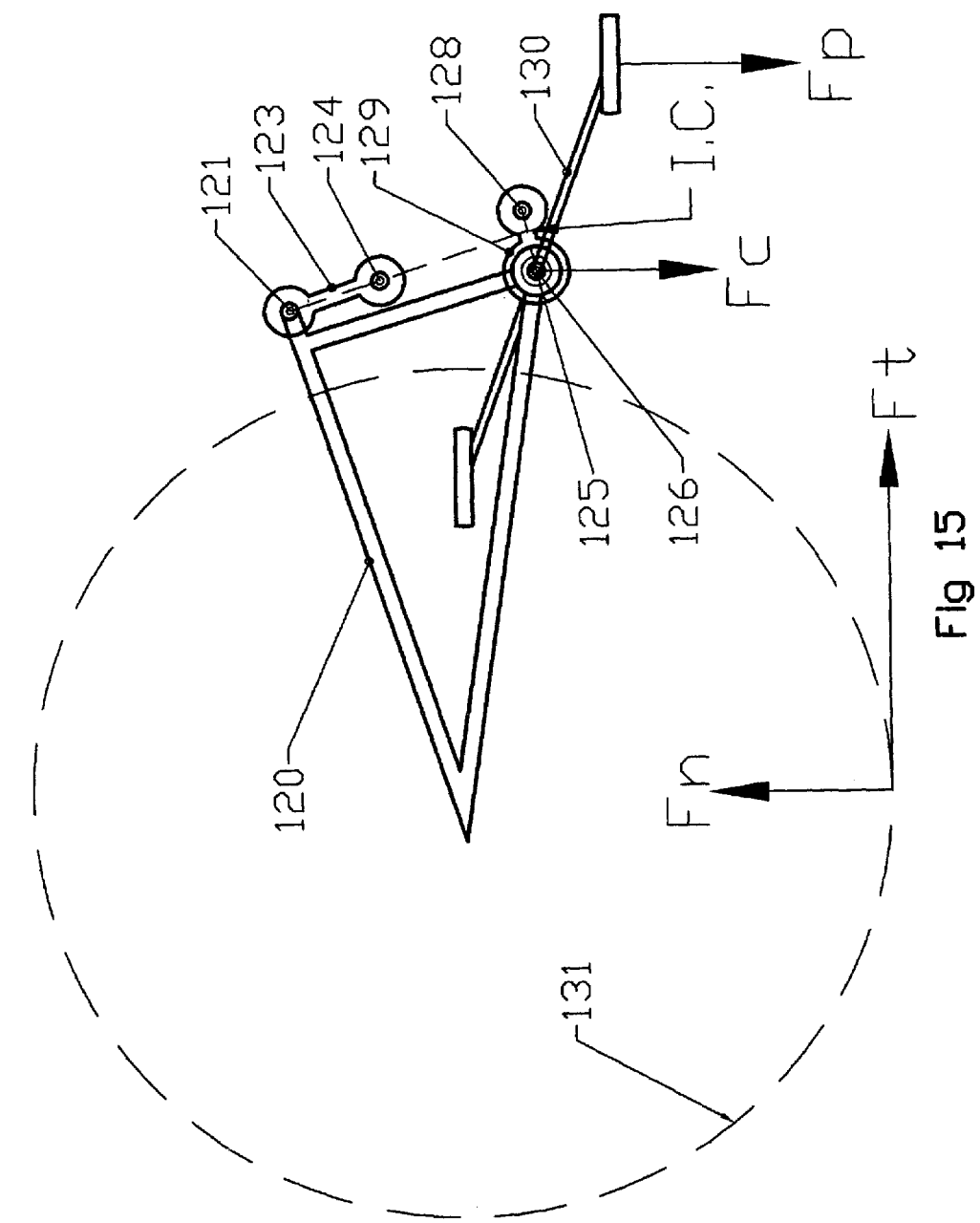

FIG. 15 shows a force diagram of my invention

Figure 16:
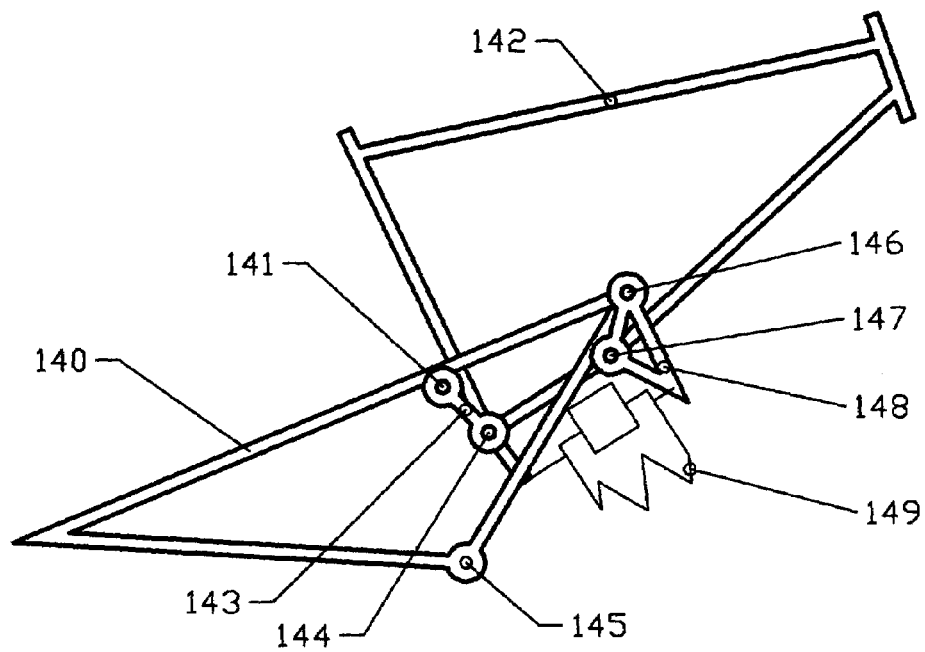

FIG. 16 shows another embodiment of my invention

Figure 17:
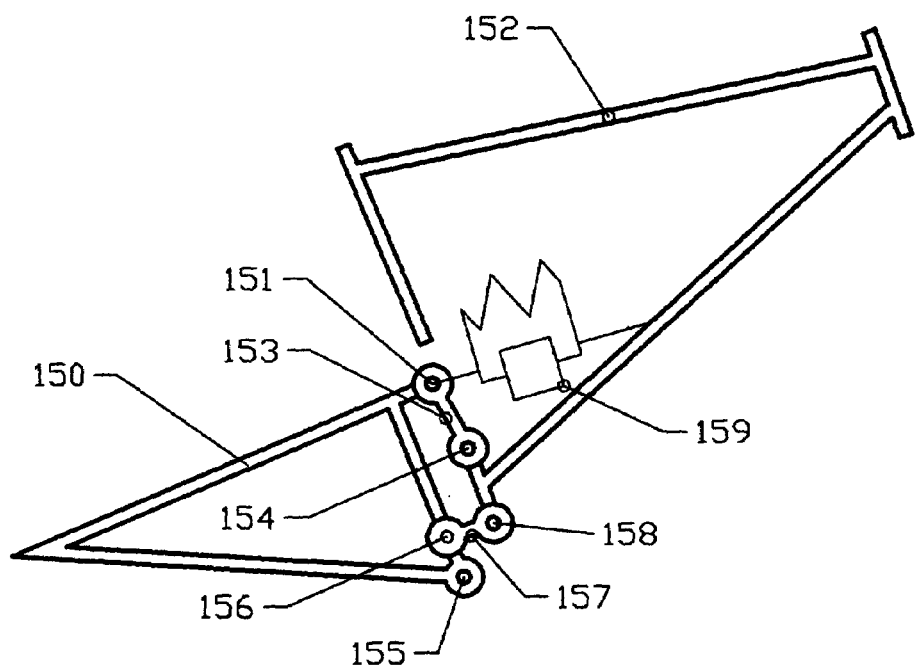

FIG. 17 shows another embodiment of my invention

List of Reference Numerals in Drawings:

| | |
|---|---|
| 1 | right dropout |
| 2 | left dropout |
| 3 | right seat stay tube |
| 4 | left seat stay tube |
| 5 | right chain stay tube |
| 6 | left chain stay tube |
| 7 | seatstay yoke |
| 8 | seat tube |
| 9 | right upper link |
| 10 | left upper link |
| 11 | right lower link |
| 12 | left lower link |
| 13 | bearing |
| 14 | bearing |
| 15 | crank housing tube |
| 16 | seat tube yoke |
| 17 | link axle |
| 18 | bearing |
| 19 | bearing |
| 20 | nut |
| 21 | nut |
| 22 | seat tube |
| 23 | link axle |
| 24 | nut |
| 25 | nut |
| 26 | bearing |
| 27 | bearing |
| 28 | shock |
| 29 | swingarm mount |
| 30 | link axle |
| 31 | nut |
| 32 | nut |
| 33 | bearing |
| 34 | bearing |
| 35 | top tube |
| 36 | down tube |
| 37 | right shock mount |
| 38 | left shock mount |
| 39 | shock bolt |
| 40 | head tube |
| 50 | swingarm |
| 51 | main frame |
| 52 | crank housing |
| 53 | swingarm pivot |
| 54 | shock |
| 60 | swingarm |
| 61 | main frame |
| 62 | crank housing |

-continued

| List of Reference Numerals in Drawings: | |
|---|---|
| 63 | swingarm pivot |
| 64 | shock |
| 70 | swingarm |
| 71 | main frame |
| 72 | crank housing |
| 73 | swingarm pivot |
| 74 | shock |
| 80 | swingarm |
| 81 | shock |
| 82 | main frame |
| 83 | crank housing |
| 84 | swingarm pivot |
| 90 | swingarm |
| 91 | main frame |
| 92 | crank housing |
| 93 | swingarm pivot |
| 94 | shock |
| 100 | swingarm |
| 101 | shock |
| 102 | main frame |
| 103 | rear link |
| 104 | crank housing |
| 105 | lower rear link pivot |
| 106 | lower forward link pivot |
| 107 | upper rear link pivot |
| 108 | upper forward link pivot |
| 110 | rear triangle |
| 111 | rearward upper link pivot |
| 112 | upper link |
| 113 | forward upper link pivot |
| 114 | main frame |
| 115 | crank housing |
| 116 | rearward lower link pivot |
| 117 | lower link |
| 118 | forward lower link pivot |
| 119 | shock |
| 120 | rearward swingarm |
| 121 | rearward upper link pivot |
| 122 | main frame |
| 123 | upper link |
| 124 | forward upper link pivot |
| 125 | crank housing |
| 126 | rearward lower link pivot |
| 128 | forward lower link pivot |
| 129 | shock |
| 130 | crank and pedal assembly |
| 131 | rear wheel |
| 140 | swingarm |
| 141 | upper rear link pivot |
| 142 | main frame |
| 143 | forward link |
| 144 | lower rear link pivot |
| 145 | crank housing |
| 146 | upper forward link pivot |
| 147 | lower forward link pivot |
| 148 | forward link |
| 149 | shock |
| 150 | swingarm |
| 151 | rearward upper link pivot |
| 152 | main frame |
| 153 | upper link |
| 154 | forward upper link pivot |
| 155 | crank housing |
| 156 | rearward lower link pivot |
| 157 | lower link |
| 158 | forward lower link pivot |
| 159 | shock |

DESCRIPTION

The preferred embodiment of the current invention is illustrated in FIG. 1. The parts can be segregated into three general assemblies: a swingarm assembly, a main frame assembly and set of connecting links. FIG. 10 shows a perspective view of the preferred embodiment.

The swingarm assembly is comprised of tubes that form two rear triangles with the forward most vertical tube in common. The right and left swingarm triangles that are mirror images about the left/right center plane of the bicycle. The right swingarm triangle is comprises a right rear dropout 1 that is connected to a right chain stay tube 5 and to a right seat stay tube 3. The other end of the seat stay tube is connected to a "Y" shaped seat stay yoke 7. The forward end of the seat stay yoke is attached to a seat tube 8. The bottom end of the seat tube is attached to the crank housing tube 15. This forms the right swingarm triangle. The left swingarm triangle is formed similarly by a left dropout 2, a left chain stay tube 6, a left seat stay tube 4, the seat stay yoke and the seat tube.

The main frame assembly is formed by a top tube 35, a down tube 36, a seat tube 22, a seat tube yoke, and a swingarm mount 29. The seat tube, seat tube yoke and the swingarm mount are lined up end to end and form the rearward side of triangle with the top tube and down tube forming the other two sides. At the forward end of the main frame, a head tube 40 is connected at the junction of the top tube and down tube.

The main frame assembly and swingarm assembly is connected together by three means: a pair of lower links, a pair of upper links and a shock 28.

A right lower link 11 and a left lower link 12 make up the lower links. The links are pivotally connected to the swingarm mount and to the crank housing tube. They are radially aligned to point forward and and slightly up from the crank housing tube. Each right and left link are mirror images of each other with respect the left/right center plane of the bicycle. Their pivot axes are collinear so that both links work together to allow rotational movement in the left/right center plane. FIG. 11 shows a close up perspective view of the set of connecting links.

A right upper link 9 and a left upper link 10 make up the upper links. The links are pivotally connected to the swingarm mount and to the seat stay yoke. They are angled upward and slightly rearward from the swingarm mount. Again, each right and left link are mirror images of each other with respect the left/right center plane of the bicycle. Their pivot axes are collinear so that both links work together to allow rotational movement in the left/right center plane. FIG. 10 shows a close up perspective view of the set of connecting links.

In this embodiment the upper links are separate pieces that act in parallel. However, they could be replaced by a single upper link. The separate links could also be joined into one unit to form a one-piece link with two three or four pivots. Similarly, the lower links could be replaced with a one-piece link with two three or four pivots.

In this embodiment a shock 28 has one pivot attached to the seat stay yoke at one end and the other end is attached to a right shock mount 37 and a left shock mount 38 by a shock bolt 39. These shock mounts are attached to the down tube. The rearward pivot of the shock is collinear with the upper pivot of the upper link. A link axle 23 which connects the shock and yoke also serves as a non-pivoting connection to the bottom of the seat tube yoke. The shock could easily be repositioned in many locations.

The orientation of the links 9, 10, 11 and 12 can be seen in the diagram in FIG. 9. The upper links and the lower links are aligned nearly perpendicular to each other when the swingarm is uncompressed. FIG. 11 shows this alignment best in a close up perspective view of the links.

OPERATION

Up until now, no unified rear triangle design has been able to obtain both of the following goals:
 a) maintain the pedal to seat distance within acceptable levels
 b) minimize the pedal induced bobbing The present invention achieves both of these goals through the use of a virtual pivot that moves the instant center of rotation as the suspension is compressed. There are many forces that are involved in determining the suspension characteristics. Although I believe that the foregoing theory of operation is correct, I do not want to be bound by it. It is only included to help explain the invention. FIG. 10 shows a diagram of some of forces that interplay in determining the suspension characteristics of the swingarm. It is neither complete nor accurate, but it will serve the purpose of explaining the theory.

There is a downward force on the crank axle Fc that comes from the rider pressing downward on a crank set 130 which is mounted to a crank housing tube 125. The crank axle force Fc is a maximum when the rider is not pedaling and is standing on both pedals. There is also the pedal force Fp that represents the downward force on the leading pedal when the rider is pedaling. There is the normal force Fn from the ground pressing on a wheel 131. There is also the traction force Ft that represents the horizontal force that propels the bike forward.

Connecting the swingarm to the frame is an upper link 123 and a lower link 127. The upper link has a rearward upper link pivot 121 and a forward upper link pivot 124. Likewise the lower link has a rearward lower link pivot 126 and a forward lower rear link pivot 128. The pivots 124 and 128 connect to the main frame while the pivots 121 and 126 connect to the swingarm. The geometry of the two links produces an instant center of rotation that is determined by the intersection of the link centerlines.

Each of the forces Fn, Ft, Fp and Fc vary with each pedal revolution and with pedal cadence. All of the forces produce a moment about the instant center of rotation. Each moment is determined by the product of the force and the perpendicular distance from the force vector to the instant center of rotation.

The preferred embodiment has the instant center of rotation located such that the variation in moments produced by Fn, Ft, Fp and Fc is minimized. This is accomplished by constructing a matrix that contains all of the possible gear combinations and pedaling cadences for both sitting and standing riders. The instant center of rotation is determined such that all of the moments cancel each other over the broadest range of circumstances.

A good location of the instant center of rotation was found to be 45 mm (1.8 inches) forward and 13 mm (0.5 inches) above crank axle. If we take the crank axle center to be the origin on an X-Y plane, this can be described by X=45 mm (1.8 inches) and Y=13 mm (0.5 inches). However, there were many instant center locations above and forward of the crank axle that also produced good results. The vertical location of the virtual pivot was found to be less important than the horizontal location.

Although this virtual pivot location provides good pedaling characteristics, the forward location of the virtual pivot causes the crank axle to move excessively up and down during suspension actuation. This is because the horizontal distance from the virtual pivot to the crank center is large enough to cause significant vertical movement of the crank center as the swingarm rotates about the virtual pivot. In order to minimize this, the links are aligned such that the instant center of rotation moves rearward through the crank axle center at full compression. By moving the instant center of rotation to the crank axle center, the crank axle movement is reduced until it is without movement when the instant center is at the crank axle center.

FIG. 12 shows the alignment of the links 123 and 129 and the location of the instant center of rotation when the suspension is uncompressed.

FIG. 13 shows the alignment of the links 123 and 129 and the location of the instant center of rotation when the suspension is at the sag point. The sag point is where the suspension is compressed a small amount due to the weight of the rider. This is typically between 10 to 25 percent of the total suspension travel. At the sag point, the instant center of rotation is at the approximate location of X=45 mm (1.8 inches) and Y=13 mm (0.5 inches).

FIG. 14 shows the alignment of the links 123 and 129 and the location of the instant center of rotation when the suspension is fully compressed.

The movement of the instant center of rotation through the suspension travel can be described as a path. In this embodiment, the path moves:
 X=64 mm, Y=19 mm (X=2.5 inches, Y=0.8 inches) at no compression
 X=45 mm, Y=13 mm (X=1.8 inches, Y=0.5 inches) at sag point
 X=−25 mm, Y=0 mm (X=−1.0 inches, Y=0 inches) at full compression However, there can be many paths that produce good results and this embodiment is just one of them. Since the height of the instant center of rotation isn't as critical, the path could have any number of variations that have different starting and finishing heights. For example, another good path would be one that is straight rearward at the level of the crank center:
 X=100 mm, Y=0 mm (X=4.0 inches, Y=0 inches) at no compression
 X=80 mm, Y=0 mm (X=3.1 inches, Y=0 inches) at sag point
 X=−25 mm, Y=0 mm (X=−1 inches, Y=0 inches) at full compression Another good path might move straight rearward at 50 mm (2.0 inches) above the crank center. Other good paths might move rearward in a descending or ascending path. The critical feature is that the path has significant horizontal movement rearward from a starting point that is in front of the crank center and moves rearward to and possibly past the horizontal location of the crank housing.

FIG. 16 shows another possible arrangement of links that would produce another good path. The instant center of rotation would start from a place forward and above the crank housing. At the sag point, the instant center would move rearward and slightly upward. At full travel, the instant center would move to a location high above and slightly rearward of the crank housing.

FIG. 17 shows yet another possible arrangement of links that would produce yet another good path. The instant center of rotation would start from a place forward and above the crank housing. At the sag point, the instant center would move rearward and slightly down along a lower link 157. At full travel, the instant center would move to a location slightly above and slightly rearward of the crank housing.

In the preferred embodiment the shock is pivotally attached between the forward links 42 and 43. The rotation of the links causes the compression of the shock. However, the shock could be located in a many different places. The shock could be located behind the seat tube and could be pivotally attached to the seat stays. Another location could be above and parallel to the down tube and pivotally attached to the rear link 24. The shock location is not a critical part of this patent.

CONCLUSION, RAMIFICATIONS AND SCOPE

Thus the reader will see the bicycle rear suspension system of the invention provides a unique solution to the problems of pedal induced bobbing and inconsistent seat to crank distance that plague previous unified rear triangle designs.

While various embodiments in accordance with the present invention have been described, it is understood that the invention is not limited thereto, and is susceptible to numerous changes and modifications as known to those skilled in the art. For example, there could be numerous locations for the shock and numerous variations on the path of the instant center of rotation. The links can also vary in configuration and quantity. Therefor, this invention is not limited to the details shown and described herein, and includes all such changes and modifications as are encompassed by the scope of the appended claims.

I claim:

1. In a bicycle rear wheel suspension comprising:
    a) a main frame,
    b) a shock absorbing means,
    c) a swingarm that moves relative to the main frame,
    d) a bicycle rear wheel attached to said swingarm,
    e) a crank assembly attached to said swingarm,
    f) and a linkage means for connecting said swingarm to said frame,
    g) said swingarm has an instant center of rotation that moves as the swingarm moves from the uncompressed to fully compressed state, the instant center of rotation is horizontally located forward of the crank assembly center when the swingarm is uncompressed and moves significantly rearward as the suspension is compressed,
    h) thus reducing in the vertical movement of said crank assembly as the swingarm is moved from the uncompressed to compressed position.

2. The bicycle rear wheel suspension of claim 1 wherein said linkage means comprises a plurality of links that pivotally connect between said swingarm and said frame.

3. The bicycle rear wheel suspension of claim 2 wherein said plurality of links comprise an upper pair and a lower pair of links.

4. The bicycle rear wheel suspension of claim 2 wherein the instant center of rotation is horizontally located forward of the crank assembly center when the swingarm is uncompressed and moves significantly rearward and upward or rearward and downward as the suspension is compressed.

5. The bicycle rear wheel suspension of claim 1 wherein when the swingarm is uncompressed, the instant center of rotation is horizontally located between 25 to 150 millimeters (1 to 6 inches) forward from the crank assembly center.

6. The bicycle rear wheel suspension of claim 1 wherein when the swingarm is compressed, the instant center of rotation is horizontally located between 25 millimeters (1 inch) in front of the crank assembly center and 50 millimeters (2 inches) rearward of the crank assembly center.

7. In a bicycle rear wheel suspension comprising:
    a) a main frame,
    b) a shock absorbing means,
    c) a swingarm that moves relative to the main frame,
    d) a bicycle rear wheel attached to said swingarm,
    e) a crank assembly attached to said swingarm,
    f) and a linkage means for connecting said swingarm to said frame,
    g) said linkage means comprise a first and second link with each link pivotally attached from the swingarm to the main frame,
    h) when the swingarm is in the uncompressed position, said first and second link are positioned so that the link centerlines intersect at a location that is a horizontally located forward of the crank assembly center
    i) when the swingarm is compressed, said first and second link are repositioned so that the link centerlines now intersect at a location that is horizontally forward or rearward of the crank assembly center,
    j) thus reducing in the vertical movement of said crank assembly as the suspension is moved from the uncompressed to compressed position.

8. The bicycle rear wheel suspension of claim 5 wherein there are additional links that operate in parallel to either said first link or said second link.

9. The bicycle rear wheel suspension of claim 5 wherein when the swingarm is in the uncompressed position, first and second links are positioned so that the link centerlines intersect at a location that is horizontally located between 25 to 150 millimeters (1 to 6 inches) forward of the crank assembly center.

10. The bicycle rear wheel suspension of claim 5 wherein when the swingarm is compressed, first and second links are repositioned so that the link centerlines now intersect at a location that is horizontally located between 25 millimeters (1 inch) in front of the crank assembly center and 50 millimeters (2 inches) rearward of the crank assembly center.

* * * * *